US009799214B2

(12) United States Patent
Ke

(10) Patent No.: US 9,799,214 B2
(45) Date of Patent: Oct. 24, 2017

(54) SYSTEMS AND METHODS FOR MULTI-DEVICE INTERACTION

(71) Applicant: Tencent Technology (Shenzhen) Company Limited, Shenzhen (CN)

(72) Inventor: Chunlin Ke, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 217 days.

(21) Appl. No.: 14/794,084

(22) Filed: Jul. 8, 2015

(65) Prior Publication Data

US 2015/0310735 A1 Oct. 29, 2015

Related U.S. Application Data

(63) Continuation of application No. PCT/CN2014/080075, filed on Jun. 17, 2014.

(30) Foreign Application Priority Data

Jun. 24, 2013 (CN) .......................... 2013 1 0252599

(51) Int. Cl.
*G05B 11/01* (2006.01)
*G08C 23/02* (2006.01)
(Continued)

(52) U.S. Cl.
CPC .......... *G08C 23/02* (2013.01); *H04M 1/7253* (2013.01); *H04M 1/72558* (2013.01);
(Continued)

(58) Field of Classification Search
CPC .... G08C 23/02; G10L 19/018; H04M 1/7253; H04M 1/72533; H04M 1/72558;
(Continued)

(56) References Cited

U.S. PATENT DOCUMENTS 5,973,491 A * 10/1999 Onizuka ................... H02J 3/06
363/124
2007/0129106 A1* 6/2007 Liu ........................ G08C 23/04
455/556.1

(Continued)

FOREIGN PATENT DOCUMENTS

CN 101631159 A 1/2010
CN 102956094 A 3/2013
(Continued)

OTHER PUBLICATIONS

Patent Cooperation Treaty, International Search Report and Written Opinion of the International Searching Authority, dated Sep. 19, 2014, in PCT/CN2014/080075.
(Continued)

*Primary Examiner* — Ojiako Nwugo
(74) *Attorney, Agent, or Firm* — Jones Day

(57) ABSTRACT

Systems, devices and methods are provided for multi-device interactions. For example, a transmitting device detects a media content control command input by a user for operation of a first application client, wherein the media content control command includes media content identification; the transmitting device encodes the media content control command into an audio identifier string; and the transmitting device transmits the audio identifier string through first sound waves. A receiving device is configured to detect the first sound waves using a second application client, extract the audio identifier string from the first sound waves, decode the audio identifier string to acquire the media content control command, and operate on first media content corresponding to the media content identification included in the media content control command.

20 Claims, 6 Drawing Sheets

(51) Int. Cl.
*H04M 1/725* (2006.01)
*H04N 21/41* (2011.01)
*H04N 21/422* (2011.01)
*H04N 21/439* (2011.01)
*H04N 21/472* (2011.01)
*G10L 19/018* (2013.01)

(52) U.S. Cl.
CPC ... *H04N 21/4126* (2013.01); *H04N 21/42219* (2013.01); *H04N 21/42221* (2013.01); *H04N 21/4394* (2013.01); *H04N 21/47217* (2013.01); *G10L 19/018* (2013.01); *H04M 1/72533* (2013.01)

(58) Field of Classification Search
CPC ......... H04N 21/4126; H04N 21/42219; H04N 21/42221; H04N 21/4394; H04N 21/47217
USPC ........................................ 367/397; 340/12.22
See application file for complete search history.

(56) References Cited

U.S. PATENT DOCUMENTS

| 2008/0045202 | A1 | 2/2008 | Chan et al. | |
| 2009/0313660 | A1* | 12/2009 | Ni | H04N 5/4403 725/78 |
| 2010/0208216 | A1* | 8/2010 | Hirabayashi | G03B 21/14 353/85 |
| 2011/0309914 | A1* | 12/2011 | Dai | G08C 17/00 340/12.22 |

FOREIGN PATENT DOCUMENTS

| CN | 102968897 A | 3/2013 |
| CN | 103152486 A | 6/2013 |
| CN | 103327021 A | 9/2013 |

OTHER PUBLICATIONS

Patent Cooperation Treaty, International Preliminary Report on Patentability, dated Dec. 29, 2015, in PCT/CN2014/080075.

* cited by examiner

SYSTEMS AND METHODS FOR MULTI-DEVICE INTERACTION

CROSS-REFERENCES TO RELATED APPLICATIONS

This application is a continuation of International Application No. PCT/CN2014/080075, with an international filing date of Jun. 17, 2014, now pending, which claims priority to Chinese Patent Application No. 201310252599.3, filed Jun. 24, 2013, both applications being incorporated by reference herein for all purposes.

BACKGROUND OF THE INVENTION

Certain embodiments of the present invention are directed to communication technology. More particularly, some embodiments of the invention provide systems and methods for device interactions. Merely by way of example, some embodiments of the invention have been applied to multiple devices. But it would be recognized that the invention has a much broader range of applicability.

On the Internet, multiple devices are often connected to a local area network for interactions between these devices. For example, the devices are connected to a Wi-Fi local area network and then the interactions between the devices are performed. However, when a network is not available or the devices are connected to different networks that are not interconnected, the interactions between the devices may not be performed.

Hence it is highly desirable to improve the techniques for multi-device interactions.

BRIEF SUMMARY OF THE INVENTION

According to one embodiment, a method is provided for multi-device interactions. For example, a transmitting device detects a media content control command input by a user for operation of a first application client, wherein the media content control command includes media content identification; the transmitting device encodes the media content control command into an audio identifier string; and the transmitting device transmits the audio identifier string through first sound waves. A receiving device is configured to detect the first sound waves using a second application client, extract the audio identifier string from the first sound waves, decode the audio identifier string to acquire the media content control command, and operate on first media content corresponding to the media content identification included in the media content control command.

According to another embodiment, a method is provided for multi-device interactions. For example, a transmitting device detects a media content control command input by a user for operation of a first application client, wherein the media content control command includes media content identification; the transmitting device encodes the media content control command into an audio identifier string; the transmitting device transmits the audio identifier string through first sound waves; a receiving device extracts the audio identifier string from the first sound waves upon detection of the first sound waves using a second application client; the receiving device decodes the audio identifier string to acquire the media content control command; and the receiving device operates on first media content corresponding to the media content identification included in the media content control command.

According to yet another embodiment, a transmitting device includes: a detection unit configured to detect a media content control command input by a user for operation of a first application client, wherein the media content control command includes media content identification; a first encoding unit configured to encode the media content control command into an audio identifier string; and a transmitting unit configured to transmit the audio identifier string through first sound waves. A receiving device is configured to detect the first sound waves using a second application client, extract the audio identifier string from the first sound waves, decode the audio identifier string to acquire the media content control command, and operate on first media content corresponding to the media content identification included in the media content control command.

In one embodiment, a multi-device interaction system includes: a transmitting device and a receiving device. The transmitting device includes: a detection unit configured to detect a media content control command input by a user for operation of a first application client, wherein the media content control command includes media content identification; a first encoding unit configured to encode the media content control command into an audio identifier string; and a transmitting unit configured to transmit the audio identifier string through first sound waves. The receiving device includes: a detection-and-extraction unit configured to detect the first sound waves using a second application client and then extract the audio identifier string from the first sound waves; a first decoding unit configured to decode the audio identifier string to acquire the media content control command; and an execution unit configured to operate on first media content corresponding to the media content identification included in the media content control command.

In another embodiment, a non-transitory computer readable storage medium includes programming instructions for multi-device interactions. The programming instructions are configured to cause one or more data processors to execute certain operations. For example, a transmitting device detects a media content control command input by a user for operation of a first application client, wherein the media content control command includes media content identification; the transmitting device encodes the media content control command into an audio identifier string; and the transmitting device transmits the audio identifier string through first sound waves. A receiving device is configured to detect the first sound waves using a second application client, extract the audio identifier string from the first sound waves, decode the audio identifier string to acquire the media content control command, and operate on first media content corresponding to the media content identification included in the media content control command.

In yet another embodiment, a non-transitory computer readable storage medium includes programming instructions for multi-device interactions. The programming instructions are configured to cause one or more data processors to execute certain operations. For example, a transmitting device detects a media content control command input by a user for operation of a first application client, wherein the media content control command includes media content identification; the transmitting device encodes the media content control command into an audio identifier string; the transmitting device transmits the audio identifier string through first sound waves; a receiving device extracts the audio identifier string from the first sound waves upon detection of the first sound waves using a second application client; the receiving device decodes the audio identifier string to acquire the media content control command; and the receiving device operates on first media content corresponding to the media content identification included in the media content control command.

For example, the systems, devices, and methods disclosed herein are configured to perform multi-device interactions when a network is unavailable or multiple devices are connected to different networks that are not interconnected and improve the interaction efficiency between the devices.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
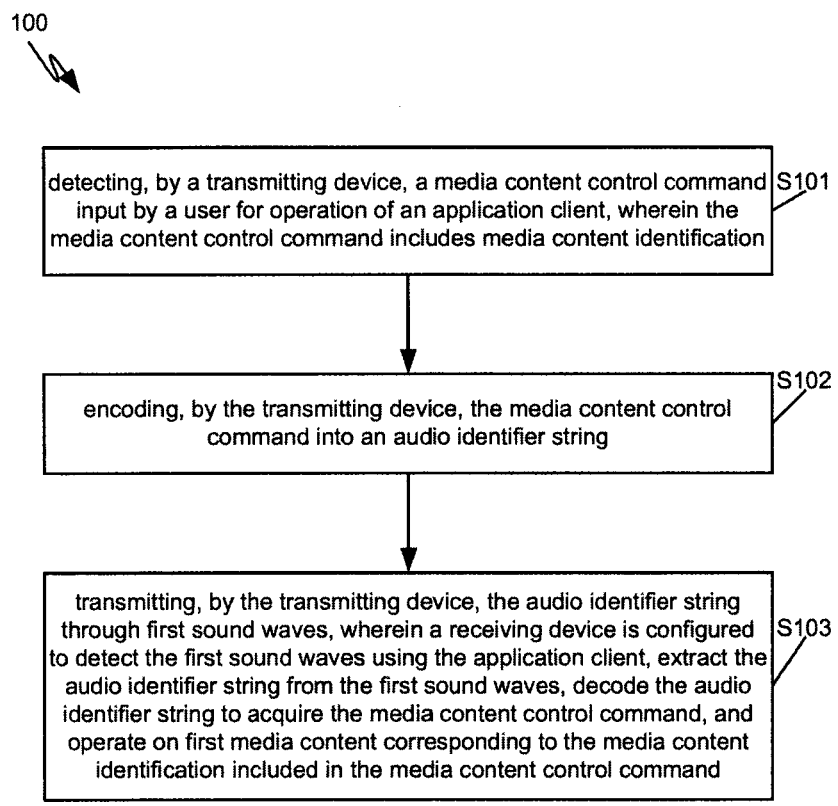
FIG. 1 is a simplified diagram showing a method for multi-device interactions according to one embodiment of the present invention.

FIG. 1 is a simplified diagram showing a method for multi-device interactions according to one embodiment of the present invention. The diagram is merely an example, which should not unduly limit the scope of the claims. One of ordinary skill in the art would recognize many variations, alternatives, and modifications. The method 100 includes at least processes S101-S103.

According to one embodiment, during the process S101, a transmitting device detects a media content control command input by a user for the operation of a first application client, where the media content control command includes media content identification. For example, the transmitting device includes a smart television, a smart phone (e.g., an Android mobile phone, an iOS mobile phone, etc.), a tablet personal computer, a palm computer, a MID (Mobile Internet Device), PAD and other suitable devices. As an example, the first application client includes a connection application program, e.g., an e-mail program, an instant message program, a GPS navigation program, and a remote access program. As another example, the first application client includes a commercial application program, such as a mobile banking service program, a stock market tracking and trading program, a file processing program, and an agenda planning program. In yet another example, the first application client includes a lifestyle application program, such as an electronic commerce program, a bill payment program, a health monitoring program, a digital reader program, and a social networking program. In yet another example, the first application client includes an entertainment application program, such as a news program, a game, a multimedia player, and a photo and video editor. The media content identification includes a media content name, a URL (Uniform Resource Locator), etc., in some embodiments. The media content control command is configured to instruct a receiving device to perform operations, e.g., download, play, close, page-turning, pause, fast-forward, rewind, volume adjustment, comment, episode choice, selection of media content, etc., according to certain embodiments.

According to another embodiment, during the process S102, the transmitting device encodes the media content control command into an audio identifier string. For example, the transmitting device maps one or more characters in the media content control command to one or more audio identifiers (e.g., respectively) according to a preset mapping relation between the characters and the audio identifiers, and joins (e.g., sequentially) the audio identifiers to form the audio identifier string.

Figure 2:
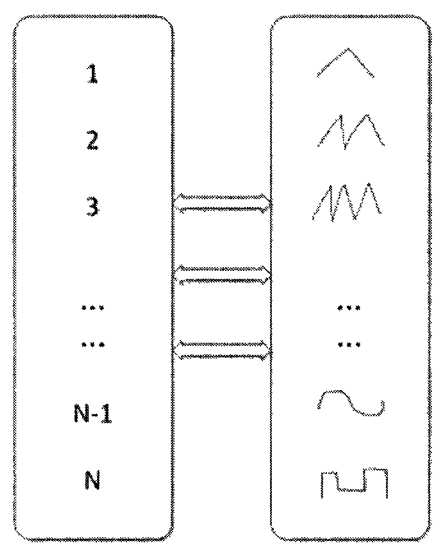
FIG. 2 is a simplified diagram showing a mapping relation between certain characters and audio identifiers according to one embodiment of the present invention.

FIG. 2 is a simplified diagram showing a mapping relation between certain characters and audio identifiers according to one embodiment of the present invention. The diagram is merely an example, which should not unduly limit the scope of the claims. One of ordinary skill in the art would recognize many variations, alternatives, and modifications.

As shown in FIG. 2, the mapping relation between the characters and the audio identifiers is pre-stored in the transmitting device, in some embodiments. For example, the transmitting device maps (e.g., respectively) all characters (such as 1, 2, . . . , N−1, N) included in the media content control command to corresponding audio identifiers, and joins (e.g., sequentially) the audio identifiers acquired through mapping so as to form the audio identifier string.

Referring back to FIG. 1, during the process S103, the transmitting device transmits the audio identifier string through sound waves, according to some embodiments. For example, the receiving device is configured to detect the first sound waves using a second application client, extract the audio identifier string from the first sound waves, decode the audio identifier string to acquire the media content control command, and operate on first media content corresponding to the media content identification included in the media content control command. As an example, the first application client run via the transmitting device and the second application client run via the receiving device can be the same or different as long as the functional interactions between the first application client and the second application client can be realized. For instance, the functional interactions between a news application client and a video application client can be realized because news also includes video news. The receiving device maps the audio identifiers in the audio identifier string to the characters according to the preset mapping relation between the characters and the audio identifiers and joins the characters to acquire the media content control command so that the receiving device can respond to the operations on the media content corresponding to the media content control command, according to some embodiments.

Figure 3:
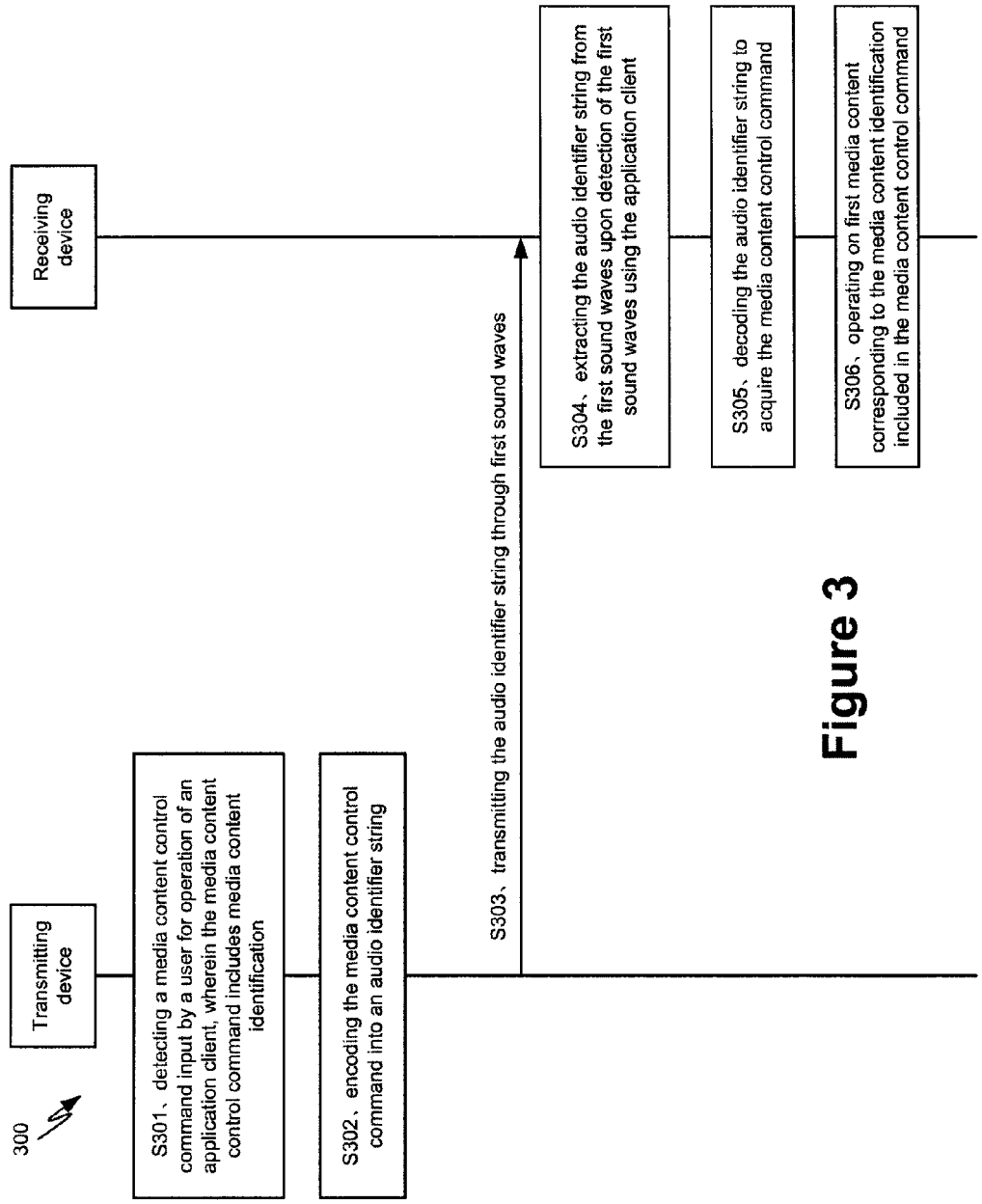
FIG. 3 is a simplified diagram showing a method for multi-device interactions according to another embodiment of the present invention.

FIG. 3 is a simplified diagram showing a method for multi-device interactions according to another embodiment of the present invention. The diagram is merely an example, which should not unduly limit the scope of the claims. One of ordinary skill in the art would recognize many variations, alternatives, and modifications. The method 300 includes at least processes S301-S306.

According to one embodiment, during the process S301, a transmitting device detects a media content control command input by the user for the operation of a first application client, wherein the media content control command is configured to instruct a receiving device to play the media content and includes media content identification. For example, the transmitting device includes a smart television, a smart phone (e.g., an Android mobile phone, an iOS mobile phone, etc.), a tablet personal computer, a palm computer, a MID (Mobile Internet Device), PAD and other suitable devices. As an example, the first application client includes a connection application program, e.g., an e-mail program, an instant message program, a GPS navigation program, and a remote access program. As another example, the first application client includes a commercial application program, such as a mobile banking service program, a stock market tracking and trading program, a file processing program, and an agenda planning program. In yet another example, the first application client includes a lifestyle application program, such as an electronic commerce program, a bill payment program, a health monitoring program, a digital reader program, and a social networking program. In yet another example, the first application client includes an entertainment application program, such as a news program, a game, a multimedia player, and a photo and video editor.

According to another embodiment, during the process S302, the transmitting device encodes the media content control command into an audio identifier string. For example, the transmitting device maps one or more characters in the media content control command to one or more audio identifiers (e.g., respectively) according to a preset mapping relation between the characters and the audio identifiers, and joins (e.g., sequentially) the audio identifiers to form the audio identifier string.

As shown in FIG. 2, the mapping relation between the characters and the audio identifiers is pre-stored in the transmitting device, in some embodiments. For example, the transmitting device maps (e.g., respectively) all characters (such as 1, 2, . . . , N−1, N) included in the media content control command to corresponding audio identifiers, and joins (e.g., sequentially) the audio identifiers acquired through mapping so as to form the audio identifier string.

Referring to FIG. 3, during the process S303, the transmitting device transmits the audio identifier string through sound waves, according to some embodiments. For example, during the process S304, the receiving device detects the sound waves using a second application client and then extracts the audio identifier string from the sound waves. As an example, the first application client run via the transmitting device and the second application client run via the receiving device can be the same or different as long as the functional interactions between the first application client and the second application client can be realized. For instance, the functional interactions between a news application client and a video application client can be realized because news also includes video news.

In one embodiment, during the process S305, the receiving device decodes the audio identifier string to acquire the media content control command. As shown in FIG. 2, the receiving device maps the audio identifiers in the audio identifier string to the characters according to the preset mapping relation between the characters and the audio identifiers and joins the characters to acquire the media content control command so that the receiving device can respond to the operations on the media content corresponding to the media content control command, according to some embodiments.

In another embodiment, during the process S306, the receiving device performs operations on media content corresponding to the media content identification included in the media content control command. For example, the receiving device plays the media content according to a developed media content playing protocol in response to the media content control command.

According to some embodiments, data transmission among the devices is performed through the sound waves without requiring the multiple devices to obtain access to a same network environment. For example, multi-screen interactions can be realized within a small range. As an example, the data transmission can be applied between one or more mobile intelligent devices, one or more television sets and one or more mobile devices.

Figure 4:
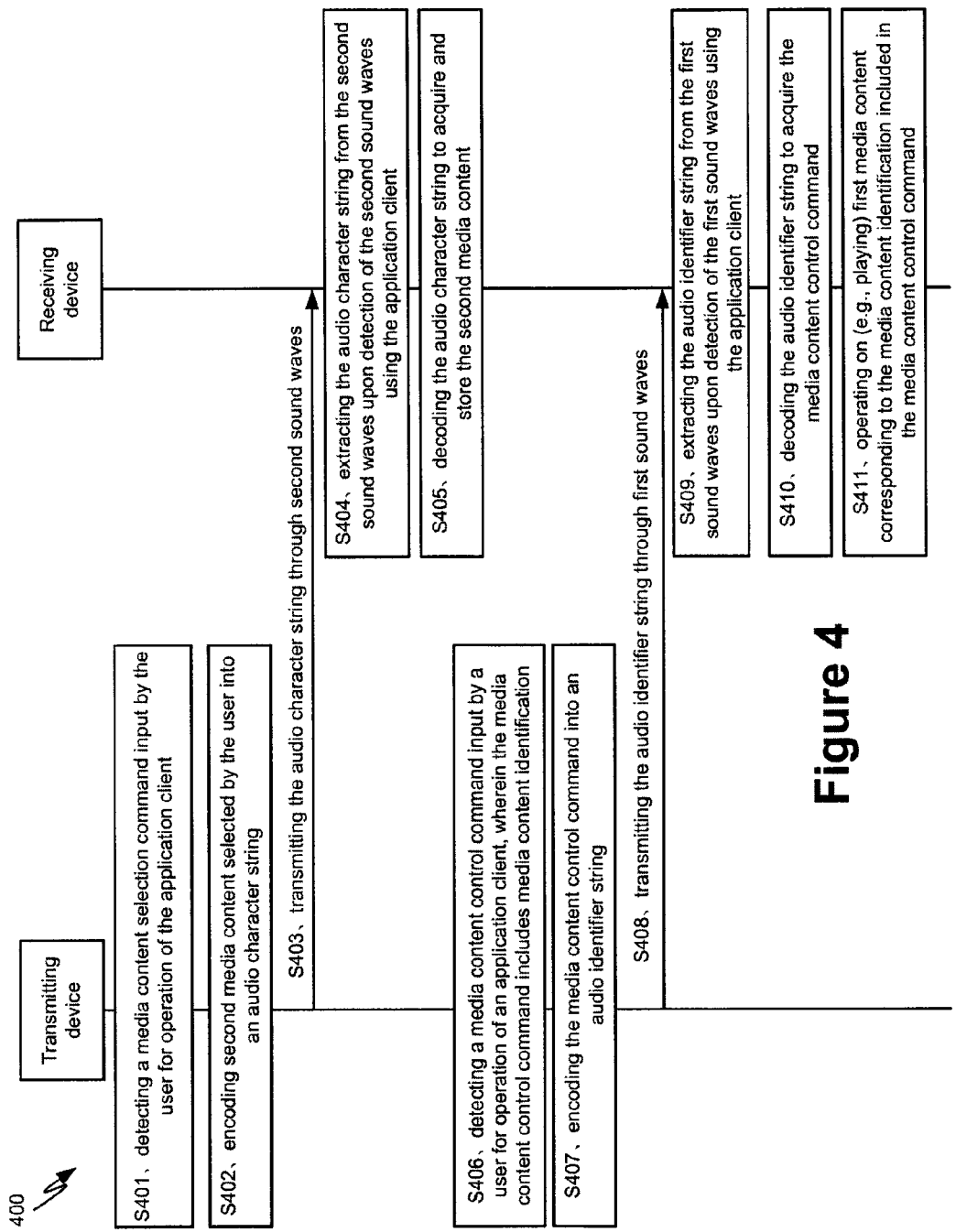
FIG. 4 is a simplified diagram showing a method for multi-device interactions according to yet another embodiment of the present invention.

FIG. 4 is a simplified diagram showing a method for multi-device interactions according to yet another embodiment of the present invention. The diagram is merely an example, which should not unduly limit the scope of the claims. One of ordinary skill in the art would recognize many variations, alternatives, and modifications. The method 400 includes at least processes S401-S411.

According to one embodiment, during the process S401, a transmitting device detects a media content selection command input by a user for the operation of a first application client when running the application client. For example, during the process S402, the transmitting device encodes the media content selected by the user into an audio character string. As an example, the transmitting device may encode the media content selected by the user into the audio character string using multimedia encoding and decoding methods, such as H246, MPEG (Moving Picture Experts Group)-1 and MPEG-2.

According to another embodiment, during the process S403, the transmitting device transmits the audio character string through sound waves. For example, during the process S404, a receiving device detects the sound waves through a second application client and then extracts the audio character string from the sound waves. In another example, during the process S405, the receiving device decodes the audio character string to acquire and store the selected media content. As an example, the receiving device may decode the audio identifier string using the multimedia encoding and decoding methods, such as H246, MPEG-1 and MPEG-2 to acquire and store the selected media content.

According to yet another embodiment, during the process S406, the transmitting device detects the media content control command input by the user for the operation of the first application client, wherein the media content control command is configured to instruct the receiving device to play the media content and includes media content identification. For example, the transmitting device includes a smart television, a smart phone (e.g., an Android mobile phone, an iOS mobile phone, etc.), a tablet personal computer, a palm computer, a MID (Mobile Internet Device), PAD and other suitable devices. As an example, the first application client includes a connection application program, e.g., an e-mail program, an instant message program, a GPS navigation program, and a remote access program. As another example, the first application client includes a commercial application program, such as a mobile banking service program, a stock market tracking and trading program, a file processing program, and an agenda planning program. In yet another example, the first application client includes a lifestyle application program, such as an electronic commerce program, a bill payment program, a health monitoring program, a digital reader program, and a social networking program. In yet another example, the first application client includes an entertainment application program, such as a news program, a game, a multimedia player, and a photo and video editor.

In one embodiment, during the process S407, the transmitting device encodes the media content control command into the audio identifier string. For example, the transmitting device maps one or more characters in the media content control command to one or more audio identifiers (e.g., respectively) according to a preset mapping relation between the characters and the audio identifiers, and joins (e.g., sequentially) the audio identifiers to form the audio identifier string.

As shown in FIG. 2, the mapping relation between the characters and the audio identifiers is pre-stored in the transmitting device, in some embodiments. For example, the transmitting device maps (e.g., respectively) all characters (such as 1, 2, . . . , N−1, N) included in the media content control command to corresponding audio identifiers, and joins (e.g., sequentially) the audio identifiers acquired through mapping so as to form the audio identifier string.

In another embodiment, during the process S408, the transmitting device transmits the audio identifier string through sound waves. For example, during the process S409, the receiving device detects the sound waves through the second application client and then extracts the audio identifier string from the sound waves. As an example, the first application client run via the transmitting device and the second application client run via the receiving device can be the same or different as long as the functional interactions between the first application client and the second application client can be realized. For instance, the functional interactions between a news application client and a video application client can be realized because news also includes video news.

In yet another example, during the process S410, the receiving device decodes the audio identifier string to acquire the media content control command. As shown in FIG. 2, the receiving device maps the audio identifiers in the audio identifier string to the characters according to the preset mapping relation between the characters and the audio identifiers and joins the characters to acquire the media content control command so that the receiving device can respond to the operations on the media content corresponding to the media content control command, according to some embodiments.

According to one embodiment, during the process S411, the receiving device performs operations on media content corresponding to the media content identification included in the media content control command. For example, the receiving device plays the media content according to a developed media content playing protocol in response to the media content control command.

Figure 5:
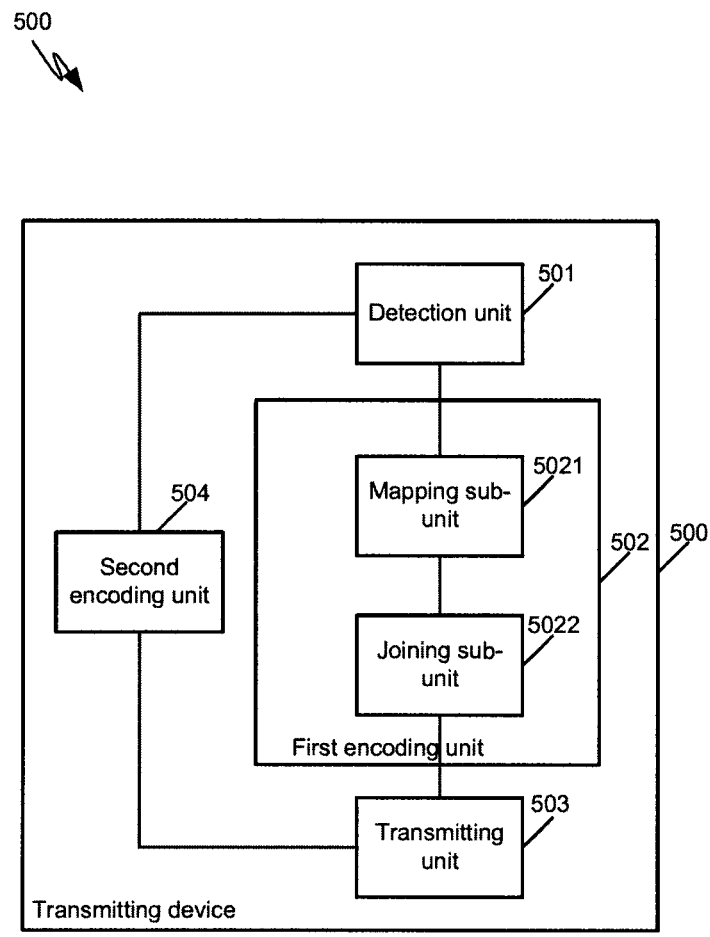
FIG. 5 is a simplified diagram showing a transmitting device for multi-device interactions according to one embodiment of the present invention.

FIG. 5 is a simplified diagram showing a transmitting device for multi-device interactions according to one embodiment of the present invention. The diagram is merely an example, which should not unduly limit the scope of the claims. One of ordinary skill in the art would recognize many variations, alternatives, and modifications. The transmitting device 500 includes: a detection unit 501, a first encoding unit 502, a transmitting unit 503, and a second encoding unit 504.

According to one embodiment, the detection unit 501 is configured to detect a media content control command input by a user for operation of a first application client, wherein the media content control command includes media content identification. For example, the first encoding unit 502 is configured to encode the media content control command into an audio identifier string. As an example, the transmitting unit 503 is configured to transmit the audio identifier string through first sound waves. In another example, a receiving device is configured to detect the first sound waves using a second application client, extract the audio identifier string from the first sound waves, decode the audio identifier string to acquire the media content control command, and operate on first media content corresponding to the media content identification included in the media content control command.

According to another embodiment, the first application client run via the transmitting device 500 and the second application client run via the receiving device can be the same or different as long as the functional interactions between the first application client and the second application client can be realized. For instance, the functional interactions between a news application client and a video application client can be realized because news also includes video news. For example, the transmitting device includes a smart television, a smart phone (e.g., an Android mobile phone, an iOS mobile phone, etc.), a tablet personal computer, a palm computer, a MID (Mobile Internet Device), PAD and other suitable devices. As an example, the first application client includes a connection application program, e.g., an e-mail program, an instant message program, a GPS navigation program, and a remote access program. As another example, the first application client includes a commercial application program, such as a mobile banking service program, a stock market tracking and trading program, a file processing program, and an agenda planning program. In yet another example, the first application client includes a lifestyle application program, such as an electronic commerce program, a bill payment program, a health monitoring program, a digital reader program, and a social networking program. In yet another example, the first application client includes an entertainment application program, such as a news program, a game, a multimedia player, and a photo and video editor. The media content control command is configured to instruct a receiving device to perform operations, e.g., download, play, close, page-turning, pause, fast-forward, rewind, volume adjustment, comment, episode choice, selection of media content, etc., according to certain embodiments.

According to yet another embodiment, the detection unit 501 is further configured to detect a media content selection command input by the user for operation of the first application client. For example, the second encoding unit 504 is configured to encode second media content selected by the user into an audio character string. In another example, the transmitting unit 503 is further configured to transmit the audio character string through second sound waves. In yet another example, the receiving device is configured to detect the second sound waves using the second application client, extract the audio character string from the second sound waves and decode the audio character string to acquire and store the second media content.

In one embodiment, the first encoding unit 502 includes: a mapping subunit 5021 configured to map one or more characters in the media content control command to one or more audio identifiers according to a preset mapping relation between the characters and the audio identifiers, and a joining subunit 5022 configured to join (e.g., sequentially) the audio identifiers to form the audio identifier string. For example, the transmitting unit 503 is configured to transmit the audio identifier string joined by the joining subunit 5022 through the sound waves.

In another embodiment, the receiving device is configured to map the audio identifiers in the audio identifier string to the characters according to the preset mapping relation between the characters and the audio identifiers and join (e.g., sequentially) the characters to acquire the media content control command.

Figure 6:
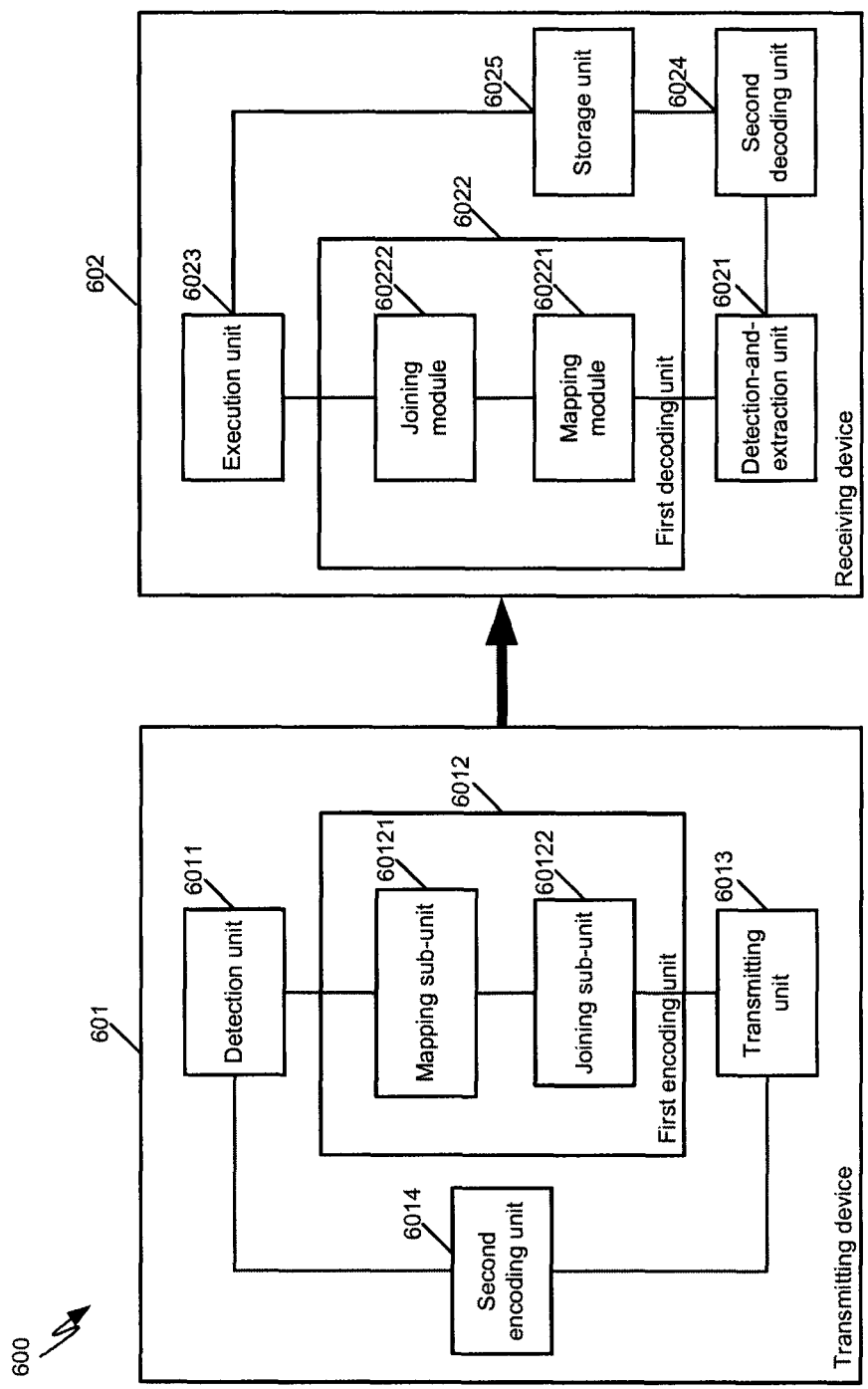
FIG. 6 is a simplified diagram showing a system for multi-device interactions according to one embodiment of the present invention.

FIG. 6 is a simplified diagram showing a system for multi-device interactions according to one embodiment of the present invention. The diagram is merely an example, which should not unduly limit the scope of the claims. One of ordinary skill in the art would recognize many variations, alternatives, and modifications. The multi-device interaction system 600 includes a transmitting device 601 and a receiving device 602.

According to one embodiment, the transmitting device 601 includes: a detection unit 6011 configured to detect a media content control command input by a user for operation of a first application client, wherein the media content control command includes media content identification, a first encoding unit 6012 configured to encode the media content control command into an audio identifier string, and a transmitting unit 6013 configured to transmit the audio identifier string through first sound waves. For example, the receiving device 602 includes: a detection-and-extraction unit 6021 configured to detect the first sound waves using a second application client and then extract the audio identifier string from the first sound waves, a first decoding unit 6022 configured to decode the audio identifier string to acquire the media content control command, and an execution unit 6023 configured to operate on first media content corresponding to the media content identification included in the media content control command.

According to another embodiment, the first application client run via the transmitting device 601 and the second application client run via the receiving device 602 can be the same or different as long as the functional interactions between the first application client and the second application client can be realized. For instance, the functional interactions between a news application client and a video application client can be realized because news also includes video news. The media content control command is configured to instruct a receiving device to perform operations, e.g., download, play, close, page-turning, pause, fast-forward, rewind, volume adjustment, comment, episode choice, selection of media content, etc., according to certain embodiments.

According to yet another embodiment, the transmitting device 601 further includes a second encoding unit 6014, and the receiving device 602 further includes a second decoding unit 6024 and a storage unit 6025. For example, the detection unit 6011 is further configured to detect a media content selection command input by the user for operation of the first application client. As an example, the second encoding unit 6014 is configured to encode second media content selected by the user into an audio character string. In another example, the transmitting unit 6013 is further configured to transmit the audio character string through second sound waves. In yet another example, a detection-and-extraction unit 6021 is further configured to detect the second sound waves using the second application client and extract the audio character string from the second sound waves. In yet another example, the second decoding unit 6024 is configured to decode the audio character string to acquire the second media content, and the storage unit 6025 is configured to store the second media content.

In one embodiment, the first encoding unit 6012 includes: a mapping subunit 60121 configured to map (e.g., respectively) one or more characters in the media content control command to one or more audio identifiers according to a preset mapping relation between the characters and the audio identifiers, and a joining subunit 60122 configured to join (e.g., sequentially) the audio identifiers to form the audio identifier string. For example, the first decoding unit 6022 includes: a mapping module 60221 configured to map (e.g., respectively) the audio identifiers in the audio identifier string to the characters according to the preset mapping relation between the characters and the audio identifiers, and a joining module 60222 configured to join (e.g., sequentially) the characters to acquire the media content control command.

According to one embodiment, a method is provided for multi-device interactions. For example, a transmitting device detects a media content control command input by a user for operation of a first application client, wherein the media content control command includes media content identification; the transmitting device encodes the media content control command into an audio identifier string; and the transmitting device transmits the audio identifier string through first sound waves. A receiving device is configured to detect the first sound waves using a second application client, extract the audio identifier string from the first sound waves, decode the audio identifier string to acquire the media content control command, and operate on first media content corresponding to the media content identification included in the media content control command. For example, the method is implemented according to at least FIG. 1.

According to another embodiment, a method is provided for multi-device interactions. For example, a transmitting device detects a media content control command input by a user for operation of a first application client, wherein the media content control command includes media content identification; the transmitting device encodes the media content control command into an audio identifier string; the transmitting device transmits the audio identifier string through first sound waves; a receiving device extracts the audio identifier string from the first sound waves upon detection of the first sound waves using a second application client; the receiving device decodes the audio identifier string to acquire the media content control command; and the receiving device operates on first media content corresponding to the media content identification included in the media content control command. For example, the method is implemented according to at least FIG. 3 and/or FIG. 4.

According to yet another embodiment, a transmitting device includes: a detection unit configured to detect a media content control command input by a user for operation of a first application client, wherein the media content control command includes media content identification; a first encoding unit configured to encode the media content control command into an audio identifier string; and a transmitting unit configured to transmit the audio identifier string through first sound waves. A receiving device is configured to detect the first sound waves using a second application client, extract the audio identifier string from the first sound waves, decode the audio identifier string to acquire the media content control command, and operate on first media content corresponding to the media content identification included in the media content control command. For example, the device is implemented according to at least FIG. 5.

In one embodiment, a multi-device interaction system includes: a transmitting device and a receiving device. The transmitting device includes: a detection unit configured to detect a media content control command input by a user for operation of a first application client, wherein the media content control command includes media content identification; a first encoding unit configured to encode the media content control command into an audio identifier string; and a transmitting unit configured to transmit the audio identifier string through first sound waves. The receiving device includes: a detection-and-extraction unit configured to detect the first sound waves using a second application client and then extract the audio identifier string from the first sound waves; a first decoding unit configured to decode the audio identifier string to acquire the media content control command; and an execution unit configured to operate on first media content corresponding to the media content identification included in the media content control command. For example, the system is implemented according to at least FIG. 6.

In another embodiment, a non-transitory computer readable storage medium includes programming instructions for multi-device interactions. The programming instructions are configured to cause one or more data processors to execute certain operations. For example, a transmitting device detects a media content control command input by a user for operation of a first application client, wherein the media content control command includes media content identification; the transmitting device encodes the media content control command into an audio identifier string; and the transmitting device transmits the audio identifier string through first sound waves. A receiving device is configured to detect the first sound waves using a second application client, extract the audio identifier string from the first sound waves, decode the audio identifier string to acquire the media content control command, and operate on first media content corresponding to the media content identification included in the media content control command. For example, the storage medium is implemented according to at least FIG. 1.

In yet another embodiment, a non-transitory computer readable storage medium includes programming instructions for multi-device interactions. The programming instructions are configured to cause one or more data processors to execute certain operations. For example, a transmitting device detects a media content control command input by a user for operation of a first application client, wherein the media content control command includes media content identification; the transmitting device encodes the media content control command into an audio identifier string; the transmitting device transmits the audio identifier string through first sound waves; a receiving device extracts the audio identifier string from the first sound waves upon detection of the first sound waves using a second application client; the receiving device decodes the audio identifier string to acquire the media content control command; and the receiving device operates on first media content corresponding to the media content identification included in the media content control command. For example, the storage medium is implemented according to at least FIG. 3 and/or FIG. 4.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A multi-device interaction method, the method comprising:
   detecting, by a transmitting device, a media content control command input by a user for operation of a first application client, wherein the media content control command includes media content identification;
   encoding, by the transmitting device, the media content control command into an audio identifier string; and
   transmitting, by the transmitting device, the audio identifier string through first sound waves;
   wherein a receiving device is configured to detect the first sound waves using a second application client, extract the audio identifier string from the first sound waves, decode the audio identifier string to acquire the media content control command, and operate on first media content corresponding to the media content identification included in the media content control command.

2. The method of claim 1, further comprising:
   detecting, by the transmitting device, a media content selection command input by the user for operation of the first application client;
   encoding, by the transmitting device, second media content selected by the user into an audio character string; and
   transmitting, by the transmitting device, the audio character string through second sound waves;
   wherein the receiving device is configured to detect the second sound waves using the second application client, extract the audio character string from the second sound waves and decode the audio character string to acquire and store the second media content.

3. The method of claim 1, wherein the media content control command is configured to instruct the receiving device to perform one or more of following operations: download, play, close, page-turning, pause, fast-forward, rewind, volume adjustment, comment, episode choice, and selection.

4. The method of claim 1, wherein the encoding, by the transmitting device, the media content control command into an audio identifier string includes:
   mapping, by the transmitting device, one or more characters in the media content control command to one or more audio identifiers according to a preset mapping relation between the characters and the audio identifiers; and
   joining, by the transmitting device, the audio identifiers to form the audio identifier string.

5. A multi-device interaction method, the method comprising:
   detecting, by a transmitting device, a media content control command input by a user for operation of a first application client, wherein the media content control command includes media content identification;
   encoding, by the transmitting device, the media content control command into an audio identifier string;
   transmitting, by the transmitting device, the audio identifier string through first sound waves;
   extracting, by a receiving device, the audio identifier string from the first sound waves upon detection of the first sound waves using a second application client;
   decoding, by the receiving device, the audio identifier string to acquire the media content control command; and
   operating, by the receiving device, on first media content corresponding to the media content identification included in the media content control command.

6. The method of claim 5, further comprising:
   detecting, by the transmitting device, a media content selection command input by the user for operation of the first application client;
   encoding, by the transmitting device, second media content selected by the user into an audio character string; and
   transmitting, by the transmitting device, the audio character string through second sound waves;
   extracting, by the receiving device, the audio character string from the second sound waves upon detection of the second sound waves using the second application client; and
   decoding, by the receiving device, the audio character string to acquire and store the second media content.

7. The method of claim 5, wherein the media content control command is configured to instruct the receiving device to perform one or more of following operations: download, play, close, page-turning, pause, fast-forward, rewind, volume adjustment, comment, episode choice, and selection.

8. The method of claim 5, wherein the encoding, by the transmitting device, the media content control command into an audio identifier string includes:
   mapping, by the transmitting device, one or more characters in the media content control command to one or more audio identifiers according to a preset mapping relation between the characters and the audio identifiers; and sequentially joining, by the transmitting device, the audio identifiers to form the audio identifier string.

9. The method of claim 8, wherein the decoding, by a receiving device, the audio identifier string to acquire the media content control command includes:
   mapping, by the receiving device, the audio identifiers in the audio identifier string to the characters according to the preset mapping relation between the characters and the audio identifiers; and
   joining, by the receiving device, the characters to acquire the media content control command.

10. A transmitting device, comprising:
   a detection unit configured to detect a media content control command input by a user for operation of a first application client, wherein the media content control command includes media content identification;
   a first encoding unit configured to encode the media content control command into an audio identifier string; and
   a transmitting unit configured to transmit the audio identifier string through first sound waves;
   wherein a receiving device is configured to detect the first sound waves using a second application client, extract the audio identifier string from the first sound waves, decode the audio identifier string to acquire the media content control command, and operate on first media content corresponding to the media content identification included in the media content control command.

11. The transmitting device of claim 10, further comprising:
   a second encoding unit;
   wherein:
      the detection unit is further configured to detect a media content selection command input by the user for operation of the first application client;
      the second encoding unit is configured to encode second media content selected by the user into an audio character string; and
      the transmitting unit is further configured to transmit the audio character string through second sound waves;
   wherein the receiving device is configured to detect the second sound waves using the second application client, extract the audio character string from the second sound waves and decode the audio character string to acquire and store the second media content.

12. The transmitting device of claim 10, wherein the media content control command is configured to instruct the receiving device to perform one or more of following operations: download, play, close, page-turning, pause, fast-forward, rewind, volume adjustment, comment, episode choice, and selection.

13. The transmitting device of claim 10, wherein the first encoding unit includes:
   a mapping subunit configured to map one or more characters in the media content control command to one or more audio identifiers according to a preset mapping relation between the characters and the audio identifiers; and
   a joining subunit configured to join the audio identifiers to form the audio identifier string.

14. The transmitting device of claim 10, further comprising:
   one or more data processors; and
   a computer-readable storage medium;
   wherein one or more of the detection unit, the first encoding unit, and the transmitting unit are stored in the storage medium and configured to be executed by the one or more data processors.

15. A multi-device interaction system comprising:
   a transmitting device; and
   a receiving device;
   wherein:
      the transmitting device includes:
         a detection unit configured to detect a media content control command input by a user for operation of a first application client, wherein the media content control command includes media content identification;
         a first encoding unit configured to encode the media content control command into an audio identifier string; and
         a transmitting unit configured to transmit the audio identifier string through first sound waves; and
      the receiving device includes:
         a detection-and-extraction unit configured to detect the first sound waves using a second application client and then extract the audio identifier string from the first sound waves;
         a first decoding unit configured to decode the audio identifier string to acquire the media content control command; and
         an execution unit configured to operate on first media content corresponding to the media content identification included in the media content control command.

16. The system of claim 15, wherein:
   the transmitting device further includes: a second encoding unit;
   the receiving device further includes: a second encoding unit and a storage unit;
   the detection unit is further configured to detect a media content selection command input by the user for operation of the first application client;
   the second encoding unit is configured to encode second media content selected by the user into an audio character string; and
   the transmitting unit is further configured to transmit the audio character string through second sound waves;
   the detection-and-extraction unit is further configured to detect the second sound waves using the second application client and extract the audio character string from the second sound waves;
   the second decoding unit is configured to decode the audio character string to acquire the second media content; and
   the storage unit is configured to store the second media content.

17. The system of claim 15, wherein the media content control command is configured to instruct the receiving device to perform one or more of following operations: download, play, close, page-turning, pause, fast-forward, rewind, volume adjustment, comment, episode choice, and selection.

18. The system of claim 15, wherein the first encoding unit includes:
   a mapping subunit configured to map one or more characters in the media content control command to one or more audio identifiers according to a preset mapping relation between the characters and the audio identifiers; and
   a joining subunit configured to join the audio identifiers to form the audio identifier string.

19. The system of claim 18, wherein the first decoding unit includes:
- a mapping module configured to map the audio identifiers in the audio identifier string to the characters according to the preset mapping relation between the characters and the audio identifiers; and
- a joining module configured to join the characters to acquire the media content control command.

20. The system of claim 15, further comprising:
- one or more data processors; and
- a computer-readable storage medium;
- wherein one or more of the detection unit, the first encoding unit, the transmitting unit, the detection-and-extraction unit, the first decoding unit, and the execution unit are stored in the storage medium and configured to be executed by the one or more data processors.

* * * * *